No. 765,590.

Patented July 19, 1904.

UNITED STATES PATENT OFFICE.

PAUL ERWIN OBERREIT, OF LUDWIGSHAFEN-ON-THE-RHINE, GERMANY, ASSIGNOR TO BADISCHE ANILIN UND SODA FABRIK, OF LUDWIGS-HAFEN-ON-THE-RHINE, GERMANY, A CORPORATION OF BADEN.

PROCESS OF PURIFYING INDIGO.

SPECIFICATION forming part of Letters Patent No. 765,590, dated July 19, 1904.

Application filed April 10, 1903. Serial No. 152,066. (No specimens.)

*To all whom it may concern:*

Be it known that I, PAUL ERWIN OBERREIT, doctor of philosophy and chemist, a subject of the King of Saxony, residing at Ludwigshafen-on-the-Rhine, in the Kingdom of Bavaria, Empire of Germany, have invented new and useful Improvements in Processes for the Purification of Indigo, of which the following is a specification.
Indigo, both natural and synthetic, frequently contains, as is known, certain impurities. I have discovered that the impurities which occur more especially in commercial synthetic indigo can be removed by heating such commercial indigo to temperatures below the sublimation or decomposition point of indigo—that is, to between two hundred and two hundred and seventy degrees centigrade, (200°–270° C.) By this means the red admixtures are destroyed without the indigo itself being injured. The decomposition products of the impurities partially escape as gas, so that the product remaining possesses a higher percentage of indigo than the original product.

The following example will serve to further illustrate the nature of my invention, which, however, is not confined to this example.

Example: Heat finely-divided artificial indigo to a temperature of two hundred and seventy degrees centigrade (270° C.) until the presence of reddish impurities can no longer be observed—for example, until a test portion of the product on being boiled up with dilute hydrochloric acid and filtered does not yield a reddish filtrate.

I claim—

1. The process for the purification of synthetic indigo which consists in heating it at temperatures sufficient to drive off impurities, but below its sublimation, or decomposition, point.

2. The process for the purification of synthetic indigo which consists in heating it to a temperature of between two hundred and two hundred and seventy degrees centigrade, (200°–270° C.)

In testimony whereof I have hereunto set my hand in the presence of two subscribing witnesses.

PAUL ERWIN OBERREIT.

Witnesses:
    ERNEST F. EHRHARDT,
    H. W. HARRIS.